US012638045B2

(12) United States Patent
Ogawa et al.

(10) Patent No.: US 12,638,045 B2
(45) Date of Patent: May 26, 2026

(54) BEARING DEVICE AND ROTATING MACHINE

(71) Applicant: Mitsubishi Heavy Industries Marine Machinery & Equipment Co., Ltd., Nagasaki (JP)

(72) Inventors: Shinji Ogawa, Tokyo (JP); Naoyuki Nagai, Tokyo (JP); Takaya Futae, Tokyo (JP); Taiyo Shirakawa, Nagasaki (JP)

(73) Assignee: MITSUBISHI HEAVY INDUSTRIES MARINE MACHINERY & EQUIPMENT CO., LTD., Nagasaki (JP)

( * ) Notice: Subject to any disclaimer, the term of this patent is extended or adjusted under 35 U.S.C. 154(b) by 351 days.

(21) Appl. No.: 18/276,547

(22) PCT Filed: Feb. 7, 2022

(86) PCT No.: PCT/JP2022/004651

§ 371 (c)(1),
(2) Date: Aug. 9, 2023

(87) PCT Pub. No.: WO2022/185848

PCT Pub. Date: Sep. 9, 2022

(65) Prior Publication Data

US 2024/0110594 A1 Apr. 4, 2024

(30) Foreign Application Priority Data

Mar. 1, 2021 (JP) ................................. 2021-031332

(51) Int. Cl.
*F16C 17/10* (2006.01)
*F16C 17/18* (2006.01)
(Continued)

(52) U.S. Cl.
CPC .............. *F16C 17/18* (2013.01); *F16C 17/10* (2013.01); *F16C 17/26* (2013.01); *F16C 33/1045* (2013.01); *F16C 2360/24* (2013.01)

(58) Field of Classification Search
CPC .......... F16C 17/02; F16C 17/10; F16C 17/18; F16C 17/24; F16C 17/26; F16C 33/1045;
(Continued)

(56) References Cited

U.S. PATENT DOCUMENTS

2017/0321747 A1 11/2017 Ertas et al.
2018/0051744 A1* 2/2018 Ammon ................... F02C 7/06
(Continued)

FOREIGN PATENT DOCUMENTS

EP 3284964 A1 2/2018
JP H02-30520 U 2/1990
(Continued)

OTHER PUBLICATIONS

Office Action dated Jul. 1, 2025, issued in counterpart KR Application No. 10-2023-7028832, with English translation. (10 pages).
(Continued)

*Primary Examiner* — Alan B Waits
(74) *Attorney, Agent, or Firm* — WHDA, LLP

(57) ABSTRACT

A bearing device is configured to rotatably support a rotational shaft of a rotating machine and includes: a semi-floating bearing supported by a bearing housing; and an anti-rotation pin fixed to the bearing housing and having an insertion portion inserted from an outer peripheral side into an insertion hole formed on an outer surface of the semi-floating bearing. At least one of the insertion hole or the insertion portion has at least one protrusion that protrudes toward the other of the insertion hole or the insertion portion in a plan view perpendicular to an axis of the rotational shaft.

7 Claims, 9 Drawing Sheets

(51) Int. Cl.
    *F16C 17/26*         (2006.01)
    *F16C 33/10*         (2006.01)
(58) Field of Classification Search
    CPC ........ F16C 2360/24; F02B 39/00; F02C 6/12;
                   F01D 25/166; F01D 25/168; F05D
                   2220/40; F05D 2240/53
    See application file for complete search history.

(56)           References Cited

U.S. PATENT DOCUMENTS

| | | | |
|---|---|---|---|
| 2020/0325939 | A1 | 10/2020 | Nishii |
| 2021/0231029 | A1* | 7/2021 | Shirakawa ............ F01D 25/186 |

FOREIGN PATENT DOCUMENTS

| | | | | |
|---|---|---|---|---|
| JP | 2006-266244 | A | 10/2006 | |
| JP | 2007-113708 | A | 5/2007 | |
| JP | 2014-009701 | A | 1/2014 | |
| JP | 2015-124871 | A | 7/2015 | |
| JP | 2017-201171 | A | 11/2017 | |
| JP | 2020-020266 | A | 2/2020 | |
| WO | WO-2020026863 | A1 * | 2/2020 | .......... F16C 33/1045 |

OTHER PUBLICATIONS

International Search Report dated Apr. 26, 2022, issued in counterpart to Application PCT/JP2022/004651. (9 pages).
Notification Concerning Transmittal of International Preliminary Report on Patentability (Forms PCT/IB/326) issued in counterpart International Application No. PCT/JP2022/004651 mailed Sep. 14, 2023, with Forms PCT/IB/373 and PCT/ISA/237. (12 pages).
Extended (Supplementary) European Search Report dated Jun. 7, 2024, issued in counterpart EP application No. 22762905.2. (8 pages).

\* cited by examiner

1 ,1A

OUTER SIDE

Y

INNER SIDE

OUTER SIDE

Y

INNER SIDE

BEARING DEVICE AND ROTATING MACHINE

TECHNICAL FIELD

The present disclosure relates to a bearing device and a rotating device including the bearing device.

The present application claims priority based on Japanese Patent Application No. 2021-031332 filed on Mar. 1, 2021, the entire content of which is incorporated herein by reference.

BACKGROUND ART

Semi-floating bearings, a type of plain bearing, are sometimes used in bearing devices rotatably supporting rotational shafts of rotating machines (e.g., turbochargers) that rotate at high speeds (for example, Patent Document 1). Semi-floating bearings have a cylindrical floating metal which is housed in a bearing support portion of the housing and through which the rotational shaft is loosely inserted. Lubricant oil is supplied to lubricate the outer peripheral side and the inner peripheral side of the floating metal, i.e., between the bearing support portion of the housing and the floating metal, and between the rotational shaft and the floating metal, respectively.

Since the floating metal is supported by the bearing support portion of the housing via lubricant oil, it tries to rotate with the rotation of the rotational shaft. The semi-floating bearing is equipped with an anti-rotation pin to restrict the rotation of the floating metal around the axis. The anti-rotation pin is fixed to the bearing support portion of the housing and inserted from the outer peripheral side into a through hole that passes through the floating metal from the inside to the outside. The rotation of the floating metal around the axis is restrained by contact of the outer peripheral surface of the anti-rotation pin with the through hole of the floating metal.

CITATION LIST

Patent Literature

Patent Document 1: JP2006-266244A

SUMMARY

Problems to be Solved

As shown in Patent Document 1, the inner peripheral surface of the through hole of the floating metal and the outer peripheral surface of the anti-rotation pin extend linearly along the respective central axes. In such a bearing device, the contact area when the inner peripheral surface of the through hole and the outer peripheral surface of the anti-rotation pin contact with each other is large, so the friction between the through hole and the anti-rotation pin may become large. If the friction between the through hole and the anti-rotation pin is large, the anti-rotation pin prevents the movement of the semi-floating bearing along the radial direction, which may impair the followability of the semi-floating bearing to vibration of the rotational shaft (vibration in the radial direction).

When the rotational shaft moves to one side in the radial direction due to vibration of the rotational shaft but the semi-floating bearing is restrained from moving to the one side due to the friction, the semi-floating bearing cannot follow the behavior of the rotational shaft, which may cause asynchronous vibration. Further, if the vibration mode of asynchronous vibration is the reverse phase mode, that is, if the semi-floating bearing vibrates in the opposite direction to the rotational shaft, the semi-floating bearing cannot follow the behavior of the rotational shaft, and the vibration of the rotational shaft cannot be dampened, so that the asynchronous vibration may become excessive.

In view of the above circumstances, an object of at least one embodiment of the present disclosure is to provide a bearing device and a rotating machine including the bearing device whereby it is possible to reduce vibration of the rotational shaft by improving the followability of the semi-floating bearing to vibration of the rotational shaft.

Solution to the Problems

A bearing device according to an embodiment of the present disclosure is a bearing device configured to rotatably support a rotational shaft of a rotating machine, including: a semi-floating bearing supported by a bearing housing; and an anti-rotation pin fixed to the bearing housing and having an insertion portion inserted from an outer peripheral side into an insertion hole formed on an outer surface of the semi-floating bearing. At least one of the insertion hole or the insertion portion has at least one protrusion that protrudes toward the other of the insertion hole or the insertion portion in a plan view perpendicular to an axis of the rotational shaft.

A rotating machine according to an embodiment of the present disclosure includes the bearing device and the rotational shaft.

Advantageous Effects

At least one embodiment of the present disclosure provides a bearing device and a rotating machine including the bearing device whereby it is possible to reduce vibration of the rotational shaft by improving the followability of the semi-floating bearing to vibration of the rotational shaft.

DETAILED DESCRIPTION

Figure 1:
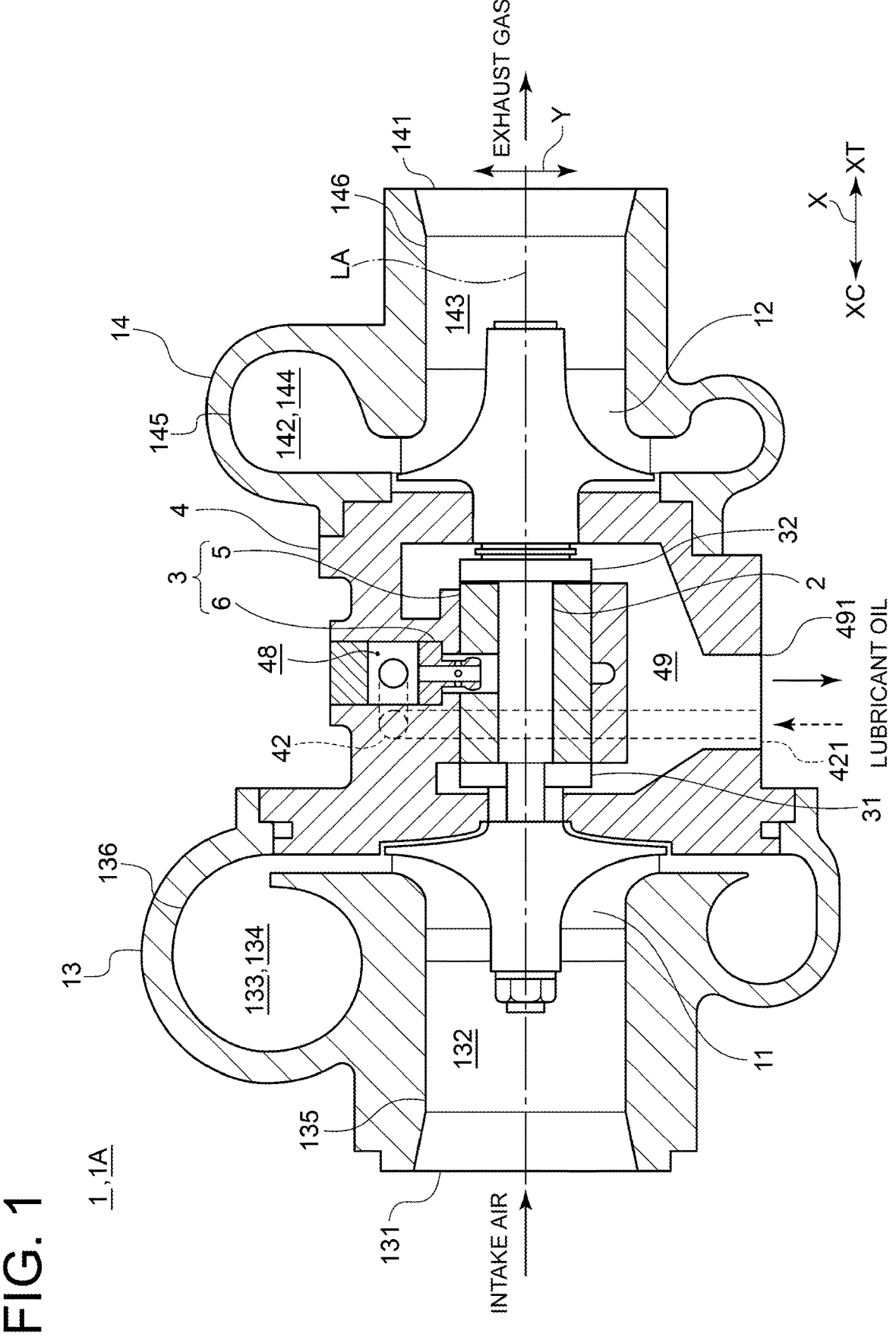
FIG. 1 is a schematic configuration diagram for describing the configuration of a rotating machine according to an embodiment of the present disclosure.

Embodiments of the present disclosure will be described below with reference to the accompanying drawings. It is intended, however, that unless particularly identified, dimensions, materials, shapes, relative positions, and the like of components described in the embodiments shall be interpreted as illustrative only and not intended to limit the scope of the present disclosure.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

The same features can be indicated by the same reference numerals and not described in detail.

(Rotating Machine, Turbocharger)

FIG. 1 is a schematic configuration diagram for describing the configuration of a rotating machine according to an embodiment of the present disclosure. In FIG. 1, a rotating machine 1 (turbocharger 1A) is shown in a schematic cross-section along the axis of the rotating machine 1, i.e., the axis LA of a rotational shaft 2.

As shown in FIG. 1, the rotating machine 1 includes a rotational shaft 2, a bearing device 3 configured to rotatably support the rotational shaft 2, and a bearing housing 4 which accommodates the bearing device 3. The bearing device 3 includes a semi-floating bearing 5 supported by the bearing housing 4, and an anti-rotation pin 6 fixed to the bearing housing 4.

In the embodiment shown in FIG. 1, the rotating machine 1 is composed of a turbocharger 1A. As shown in FIG. 1, the turbocharger 1A includes the above-described rotational shaft 2, the above-described bearing device 3, the above-described bearing housing 4, an impeller 11 disposed on one side (left side in FIG. 1) of the rotational shaft 2, and a turbine rotor 12 disposed on the other side (right side in FIG. 1) of the rotational shaft 2. The present disclosure can be applied to a rotating machine 1 other than the turbocharger 1A.

Hereinafter, the extension direction of the axis LA of the rotational shaft 2 is defined as the axial direction X of the rotational shaft 2, and the direction perpendicular to the axis LA is defined as the radial direction Y. In the axial direction X, the side where the impeller 11 is located with respect to the turbine rotor 12 is defined as the compressor side XC, and the side opposite the compressor side XC, i.e., the side where the turbine rotor 12 is located with respect to the impeller 11, is defined as the turbine side XT. Further, the outer side in the radial direction Y is also simply expressed as the outer peripheral side, and the inner side in the radial direction Y as the inner peripheral side. The bearing device 3 is disposed between the impeller 11 and the turbine rotor 12 in the axial direction X of the rotational shaft 2.

The turbocharger 1A includes a compressor housing 13 which accommodates the impeller 11, and a turbine housing 14 which accommodates the turbine rotor 12. The bearing housing 4 is disposed between the compressor housing 13 and the turbine housing 14 in the axial direction X of the rotational shaft 2. The bearing housing 4 may be fastened to each of the compressor housing 13 and the turbine housing 14 with fastening members (e.g., bolts) (not shown).

The compressor housing 13 has a gas introduction port 131 formed in one end portion (end portion on the compressor side XC) of the turbocharger 1A in the axial direction X. The gas introduction port 131 opens toward the compressor side XC along the axial direction X. The turbine housing 14 has an exhaust gas discharge port 141 formed in the other end portion (end portion on the turbine side XT) of the turbocharger 1A in the axial direction X. The exhaust gas discharge port 141 opens toward the turbine side XT along the axial direction X.

The compressor housing 13 internally has a gas introduction passage 132 for supplying the gas introduced from the outside of the compressor housing 13 to the impeller 11, and a gas discharge passage 133 for discharging the gas having passed through the impeller 11 to the outside of the impeller 11. The gas discharge passage 133 includes a spiral scroll passage 134 formed on the outer peripheral side of the impeller 11. The compressor housing 13 has an inner surface (gas introduction-side inner surface) 135 that defines the gas introduction passage 132 and an inner surface (gas discharge-side inner surface) 136 that defines the gas discharge passage 133. The gas introduction port 131 is formed at the upstream end of the inner surface 135. The impeller 11 is configured to guide the gas introduced through the gas introduction passage 132 from the compressor side XC in the axial direction X to the outer side in the radial direction Y.

The turbine housing 14 internally has an exhaust gas introduction passage 142 for supplying the exhaust gas introduced from the outside of the turbine housing 14 to the turbine rotor 12, and an exhaust gas discharge passage 143 for discharging the exhaust gas having passed through the turbine rotor 12 to the outside. The exhaust gas introduction passage 142 includes a spiral scroll passage 144 formed on the outer peripheral side of the turbine rotor 12. The turbine housing 14 has an inner surface (exhaust gas introduction-side inner surface) 145 that defines the exhaust gas introduction passage 142 and an inner surface (exhaust gas discharge-side inner surface) 146 that defines the exhaust gas discharge passage 143. The exhaust gas discharge port 141 is formed at the downstream end of the inner surface 146. The turbine rotor 12 is configured to guide the exhaust gas introduced through the exhaust gas introduction passage 142 from the outer side in the radial direction Y to the turbine side XT in the axial direction X.

The gas having passed through the impeller 11 and the gas discharge passage 133 is led to a combustion engine (e.g., engine, not shown) and is used for combustion in the combustion engine. The exhaust gas produced by combustion in the combustion engine is led through the exhaust gas introduction passage 142 to the turbine rotor 12.

The turbocharger 1A is configured to rotate the turbine rotor 12 by energy of exhaust gas discharged from the combustion engine. Since the impeller 11 is mechanically connected to the turbine rotor 12 via the rotational shaft 2, the impeller 11 rotates in conjunction with the rotation of the turbine rotor 12. The turbocharger 1A is configured to increase the pressure of the gas passing through the impeller 11 by rotation of the impeller 11 and supply it to the combustion engine.

(Bearing Device, Semi-Floating Bearing)

Figure 2:
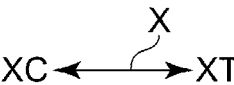
FIG. 2 is a schematic cross-sectional view schematically showing a cross-section along the axis in the vicinity of a bearing device of a rotating machine according to an embodiment of the present disclosure.
Figure 3:
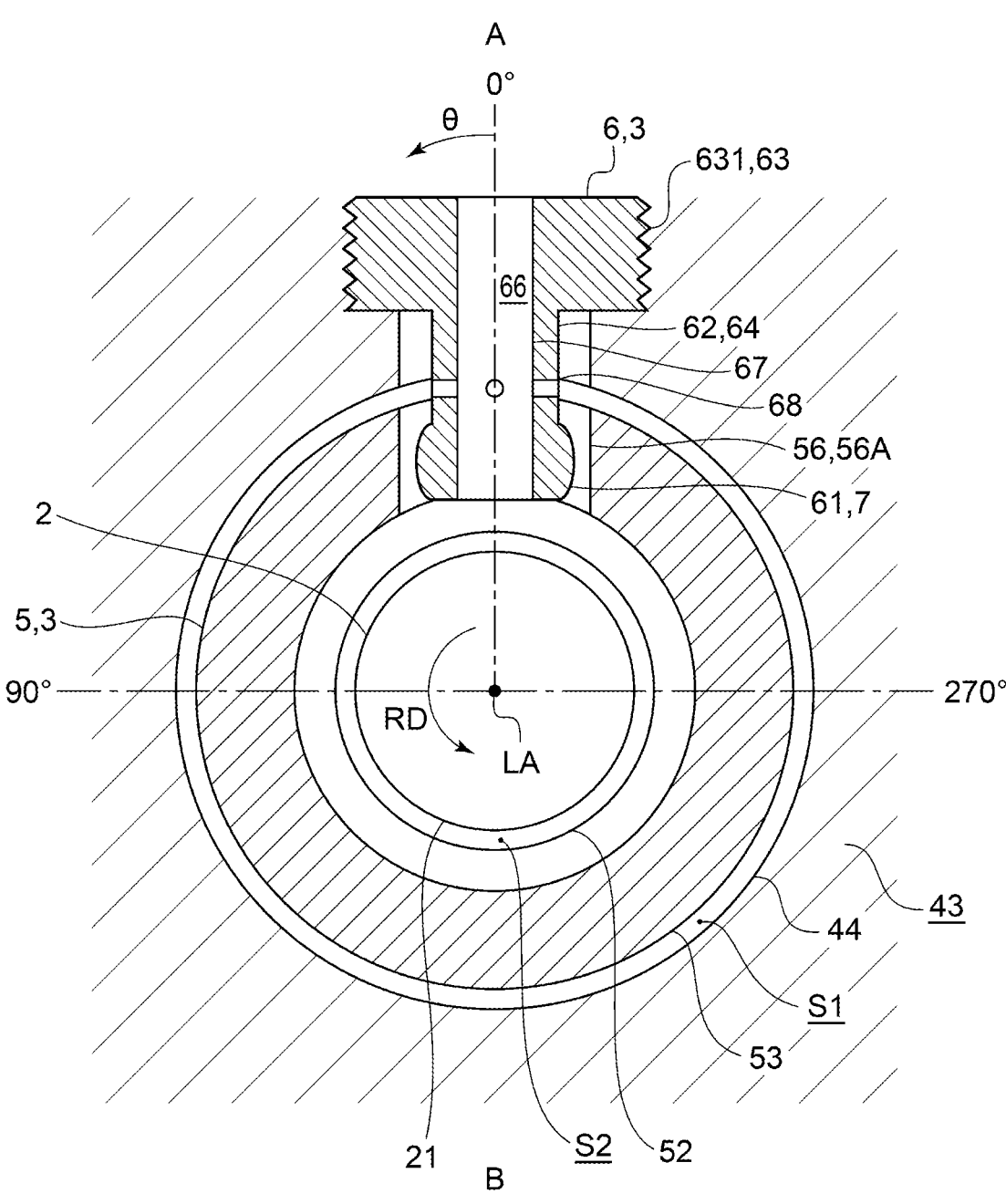
FIG. 3 is a schematic cross-sectional view schematically showing a cross-section perpendicular to the axis in the vicinity of a bearing device of a rotating machine according to an embodiment of the present disclosure.

FIG. 2 is a schematic cross-sectional view schematically showing a cross-section along the axis in the vicinity of a bearing device of a rotating machine according to an embodiment of the present disclosure. FIG. 3 is a schematic cross-sectional view schematically showing a cross-section (cross-section A-B in FIG. 2) perpendicular to the axis in the vicinity of a bearing device of a rotating machine according to an embodiment of the present disclosure.

As shown in FIG. 2, the semi-floating bearing 5 is formed in a tubular shape (in the illustrated example, cylindrical shape) having a shaft insertion hole 51 through which the rotational shaft 2 is inserted. In a cross-sectional view along the axis LA as shown in FIG. 2, the semi-floating bearing 5 has an inner surface 52 (inner peripheral surface) that extends along the axial direction X and constitutes the shaft insertion hole 51, an outer surface 53 (outer peripheral surface) that extends along the axial direction X, and a pair of axial end surfaces 54A, 55A that connect the axial ends of the inner surface 52 and the outer surface 53.

The bearing housing 4 has an interior space 41 for accommodating the semi-floating bearing 5 through which the rotational shaft 2 is inserted, and a lubricant oil introduction passage 42 for introducing lubricant oil to the semi-floating bearing 5 disposed in the interior space 41. The interior space 41 communicates with the lubricant oil introduction passage 42. Lubricant oil introduced from the outside of the bearing housing 4 through the lubricant oil introduction passage 42 flows into the interior space 41.

The bearing housing 4 includes a bearing support portion 43 configured to support the semi-floating bearing 5. The bearing support portion 43 has a support surface 44 surrounding the outer peripheral side of the semi-floating bearing 5. The support surface 44 defines a part of the interior space 41 and faces the outer surface 53 of the semi-floating bearing disposed in the interior space 41.

A gap (outer peripheral space S1) is formed between the outer surface 53 of the semi-floating bearing 5 and the support surface 44 of the bearing housing 4. A gap (inner peripheral space S2) is formed between the inner surface 52 of the semi-floating bearing 5 and an outer surface 21 of the rotational shaft 2. In other words, the semi-floating bearing 5 is arranged with the outer peripheral space S1 between it and the bearing support portion 43 (bearing housing 4) and the inner peripheral space S2 between it and the rotational shaft 2.

As shown in FIG. 2, the turbocharger 1A includes a pair of thrust collars 31, 32 mounted on the rotational shaft 2. The semi-floating bearing 5 is disposed between the thrust collar 31 and the thrust collar 32 in the axial direction X. One of the thrust collars 31, 32 may be integrally formed with the rotational shaft 2, or both the thrust collars 31, 32 may be separately formed from the rotational shaft 2 and fixed to the rotational shaft 2.

The semi-floating bearing 5 is arranged with a slight axial gap S3 between the axial end surface 54A formed at one end portion 54 in the axial direction X and the thrust collar 31. The semi-floating bearing 5 is arranged with a slight axial gap S4 between the axial end surface 55A formed at the other end portion 55 in the axial direction X and the thrust collar 32.

The semi-floating bearing 5 functions as a semi-floating bearing when the outer peripheral space S1, the inner peripheral space S2, and the axial gaps S3, S4 of the interior space 41 are filled with lubricant oil.

Specifically, the semi-floating bearing 5 is supported by the bearing support portion 43 (bearing housing 4) via an oil film formed in the outer peripheral space S1 between the outer surface 53 of the semi-floating bearing 5 and the support surface 44 of the bearing housing 4. The semi-floating bearing 5 rotatably supports the rotational shaft 2 via an oil film formed in the inner peripheral space S2 between the inner surface 52 of the semi-floating bearing 5 and the outer surface 21 of the rotational shaft 2. Further, the semi-floating bearing 5 bears the radial load of the rotational shaft 2 via the oil film formed in the inner peripheral space S2. The semi-floating bearing 5 bears the thrust load of the rotational shaft 2 via lubricant oil supplied to the axial gaps S3, S4 between the axial end surfaces 54A, 55A of the semi-floating bearing 5 and the thrust collars 31, 32.

(Insertion Hole)

The semi-floating bearing 5 has an insertion hole 56 formed on the outer surface 53 for inserting the anti-rotation pin 6. In the illustrated embodiment, the insertion hole 56 is formed at the central position of the semi-floating bearing 5 in the axial direction X, but it may be formed at a position deviating from the central position in the axial direction X. The anti-rotation pin 6 is inserted into the insertion hole 56 from the outer peripheral side. The insertion hole 56 extends from an outer opening edge 571 of the insertion hole 56 formed on the outer surface 53 to the inner peripheral side of the semi-floating bearing 5. In the illustrated embodiment, the insertion hole 56 includes a through hole 56A that penetrates from the outer surface 53 to the inner surface 52. Alternatively, in some embodiments, the insertion hole 56 may be a non-through hole.

(Anti-Rotation Pin)

The anti-rotation pin 6 is formed in a rod shape with the longitudinal direction along the central axis CA. The anti-rotation pin 6 is loosely inserted into the insertion hole 56 on one side in the extension direction of the central axis CA. In other words, the anti-rotation pin 6 is fitted into the insertion hole 56 with a gap between the anti-rotation pin 6 and the insertion hole 56. The gap between the anti-rotation pin 6 and the insertion hole 56 is shorter than the axial gaps S3, S4, so that when the semi-floating bearing 5 is displaced in the axial direction X, the anti-rotation pin 6 and the insertion hole 56 contact before the semi-floating bearing 5 and the pair of thrust collars 31, 32 contact.

The anti-rotation pin 6 has an insertion portion 61 inserted into the insertion hole 56 on one side in the extension direction of the central axis CA and a non-insertion portion 62 not inserted into the insertion hole 56 on the other side in the extension direction of the central axis CA. The non-insertion portion 62 is fixed to the bearing support portion 43 (bearing housing 4), making the anti-rotation pin 6 immobile against rotation of the rotational shaft 2. That is, the anti-rotation pin 6 remains stationary during rotation of the rotational shaft 2.

The semi-floating bearing 5 is restrained from rotating around the axis LA by the insertion hole 56 and the insertion portion 61 of the anti-rotation pin 6. Specifically, when the rotational shaft 2 rotates, the semi-floating bearing 5 tries to rotate in accordance with the rotation of the rotational shaft 2, but the insertion hole 56 contacts the insertion portion 61 of the anti-rotation pin 6, preventing the semi-floating bearing 5 from rotating further. Since the semi-floating bearing 5 is allowed to move slightly, it can function as a semi-floating bearing.

In the illustrated embodiment, the bearing housing 4 has a radial hole 45 extending along the radial direction Y so as to connect the outside of the bearing housing 4 and the interior space 41. The non-insertion portion 62 of the anti-rotation pin 6 includes a large-diameter portion 63 with a larger diameter than the insertion portion 61. The large-diameter portion 63 engages the radial hole 45 (in the illustrated example, male thread 631 of the large-diameter portion 63 screws with female thread 46 of the radial hole 45), thereby securing the anti-rotation pin 6 to the bearing support portion 43 (bearing housing 4).

The radial hole 45 of the bearing housing 4 is closed by a plug 47 fixed outward of the anti-rotation pin 6 in the radial direction Y, and a space 48 is formed between the anti-rotation pin 6 and the plug 47 in the radial hole 45.

A lubricant oil passage 66 for supplying lubricant oil between the inner surface 52 of the semi-floating bearing 5 and the outer surface 21 of the rotational shaft 2, i.e., to the inner peripheral space S2, is formed inside the anti-rotation pin 6. The anti-rotation pin 6 is formed in a tubular shape with a through hole 67 that passes through along the central axis CA, and the lubricant oil passage 66 is defined by the through hole 67. The inner peripheral space S2 communicates with the space 48 via the lubricant oil passage 66 and the through hole 56A.

The anti-rotation pin 6 has at least one oil supply hole 68 that connects the through hole 67 and a small-diameter portion 64 with a smaller diameter than the large-diameter portion 63. The outer peripheral space S1 communicates with the space 48 via the oil supply hole 68 and the lubricant oil passage 66. The oil supply hole 68 may extend along the circumferential direction of the rotational shaft 2. A plurality of (four in the illustrated example) oil supply holes 68 may be provided radially around the central axis CA of the anti-rotation pin 6.

In the illustrated embodiment, as shown in FIG. 1, an oil inlet 421 for introducing lubricant oil to the bearing housing 4 is formed on the outer surface of the bearing housing 4. The lubricant oil from the oil inlet 421 is introduced into the space 48 through the lubricant oil introduction passage 42 formed inside the bearing housing 4. That is, the lubricant oil introduction passage 42 is a passage that connects the oil inlet 421 and the space 48 to introduce lubricant oil from the oil inlet 421 to the space 48.

As shown in FIG. 2, lubricant oil is supplied to the outer peripheral space S1 and the inner peripheral space S2 through the lubricant oil introduction passage 42, the space 48, the lubricant oil passage 66, the through hole 56A, and the oil supply hole 68. Further, lubricant oil is supplied to the axial gaps S3, S4 through the outer peripheral space S1 and the inner peripheral space S2.

The lubricant oil leaking out of the outer peripheral space S1 or the inner peripheral space S2 is discharged from an oil outlet 491 (see FIG. 1) through an oil discharge space 49 disposed below the bearing device 3.

The semi-floating bearing 5 is supported by the pressure of the oil film formed in the outer peripheral space S1 between the outer surface 53 and the support surface 44 of the bearing housing 4, thereby functioning as a squeeze film damper bearing. That is, the semi-floating bearing 5 vibrates along the vibration direction of the rotational shaft 2 in response to vibration of the rotational shaft 2. As the pressure of the oil film formed in the outer peripheral space S1 increases or decreases in accordance with the relative speed of the semi-floating bearing 5 in the direction of increasing or decreasing the gap between the outer surface 53 and the support surface 44, damping force against vibration of the rotational shaft 2 is generated.

As shown in FIG. 3, in a plan view perpendicular to the axis LA of the rotational shaft 2, the top position in the vertical direction (top-bottom direction in FIG. 3) is defined as the 0° position, the rotational direction RD of the rotational shaft 2 around the axis LA is defined as the forward direction, and the angle along the circumferential direction of the rotational shaft 2 in the forward direction with respect to the 0° position is defined as θ. The insertion hole 56 (through hole 56A) of the semi-floating bearing 5 and the insertion portion 61 of the anti-rotation pin 6 are provided above the axis LA in the vertical direction, i.e., within an angular range satisfying the condition of −90°<θ<90°. The insertion hole 56 (through hole 56A) and the insertion portion 61 are preferably provided within an angular range satisfying the condition of −60°<θ<60°, more preferably −30°<θ<30°. By providing the insertion hole 56 (through hole 56A) and the insertion portion 61 on the upper side in the vertical direction, lubricant oil flowing down due to gravity can be supplied from the space 48 to the insertion hole 56 (through hole 56A) and the insertion portion 61.

Bearing Device According to Comparative Example

Figure 4:
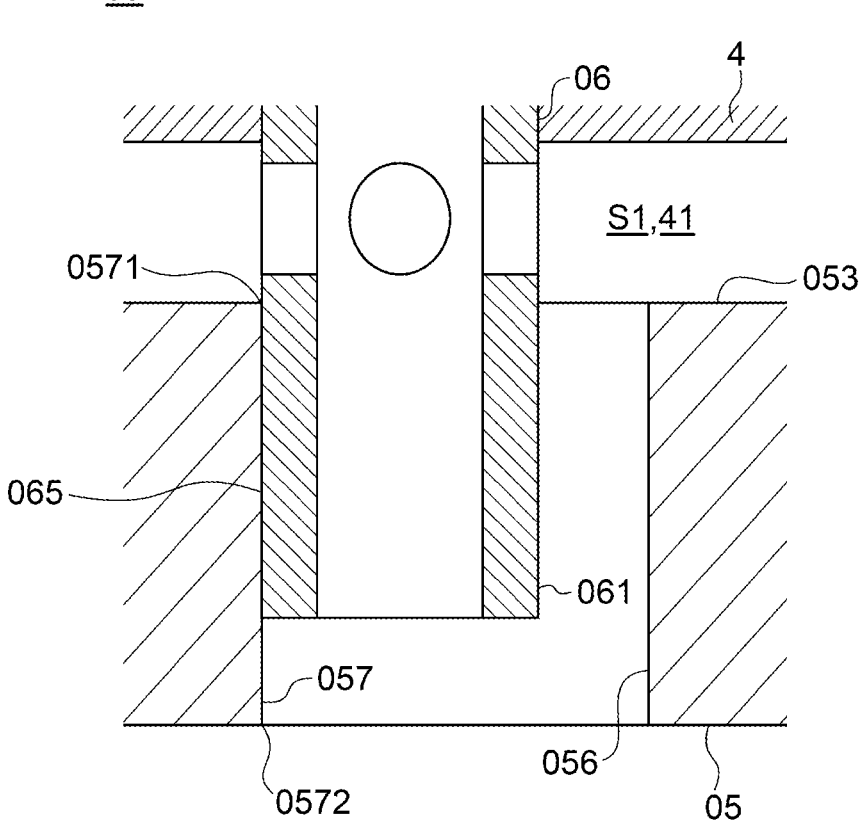
FIG. 4 is an explanatory diagram for describing a bearing device according to a comparative example.
Figure 4:
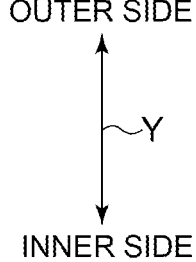

FIG. 4 is an explanatory diagram for describing a bearing device according to a comparative example. In FIG. 4, a bearing device 03 mounted on the turbocharger 1A is shown in a schematic cross-section perpendicular to the axis LA of the bearing device 03.

As shown in FIG. 4, the bearing device 03 according to a comparative example includes a semi-floating bearing 05 supported by the bearing housing 4, and an anti-rotation pin 06 fixed to the bearing housing 4. The anti-rotation pin 06 has an insertion portion 061 inserted from the outer peripheral side into an insertion hole 056 formed on an outer surface 053 of the semi-floating bearing 05.

The insertion hole 056 of the semi-floating bearing 05 has an inner surface 057 extending linearly along the direction perpendicular to the axis LA from the outer opening edge 0571 to the inner opening edge 0572. The insertion portion 061 of the anti-rotation pin 06 has an outer surface 065 extending linearly along the direction perpendicular to the axis LA. The anti-rotation pin 06 is arranged so that the outer surface 065 faces the inner surface 057 of the insertion hole 056. When the semi-floating bearing 05 moves inside the interior space 41, the outer surface 065 of the insertion portion 061 of the anti-rotation pin 06 may contact the inner surface 057 of the insertion hole 056.

In the bearing device 03 according to a comparative example, the contact area when the inner surface 057 and the outer surface 065 contact is large, so the friction between the inner surface 057 and the outer surface 065 may become large. If the friction between the inner surface 057 and the outer surface 065 is large, the anti-rotation pin 06 prevents the movement of the semi-floating bearing 05 along the radial direction, which may impair the followability of the semi-floating bearing 05 to vibration of the rotational shaft 2 (vibration in the radial direction).

When the rotational shaft 2 moves to one side in the radial direction due to vibration of the rotational shaft 2 but the semi-floating bearing 05 is restrained from moving to the one side due to the friction, the semi-floating bearing 05 cannot follow the behavior of the rotational shaft 2, which may cause asynchronous vibration. Further, if the vibration mode of asynchronous vibration is the reverse phase mode, that is, if the semi-floating bearing 05 vibrates in the opposite direction to the rotational shaft 2, the semi-floating bearing 05 cannot follow the behavior of the rotational shaft 2, and the vibration of the rotational shaft 2 cannot be dampened, so that the asynchronous vibration may become excessive.

Figure 5:
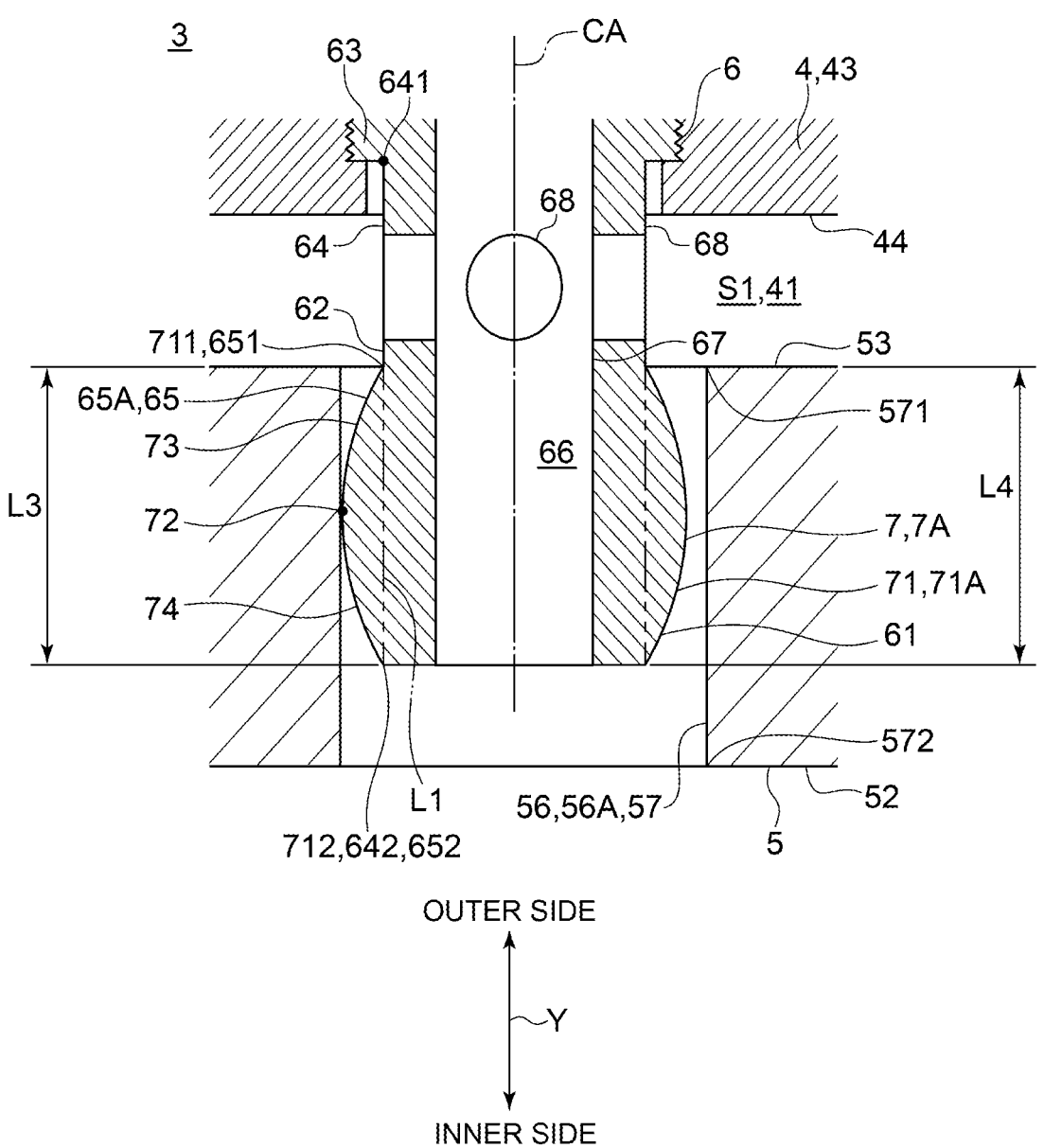
FIG. 5 is a schematic cross-sectional view schematically showing a cross-section perpendicular to the axis of the bearing device according to the first embodiment.
Figure 6:
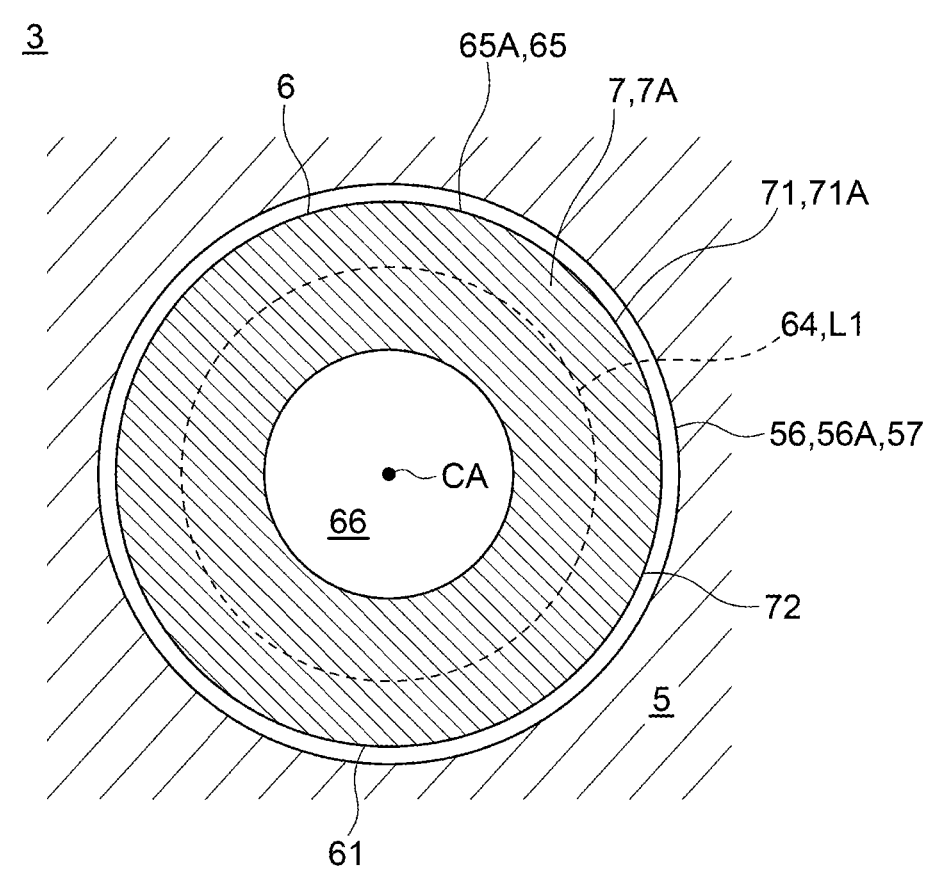
FIG. 6 is a schematic cross-sectional view schematically showing a cross-section perpendicular to the central axis of the anti-rotation pin of the bearing device according to the first embodiment.
Figure 7:
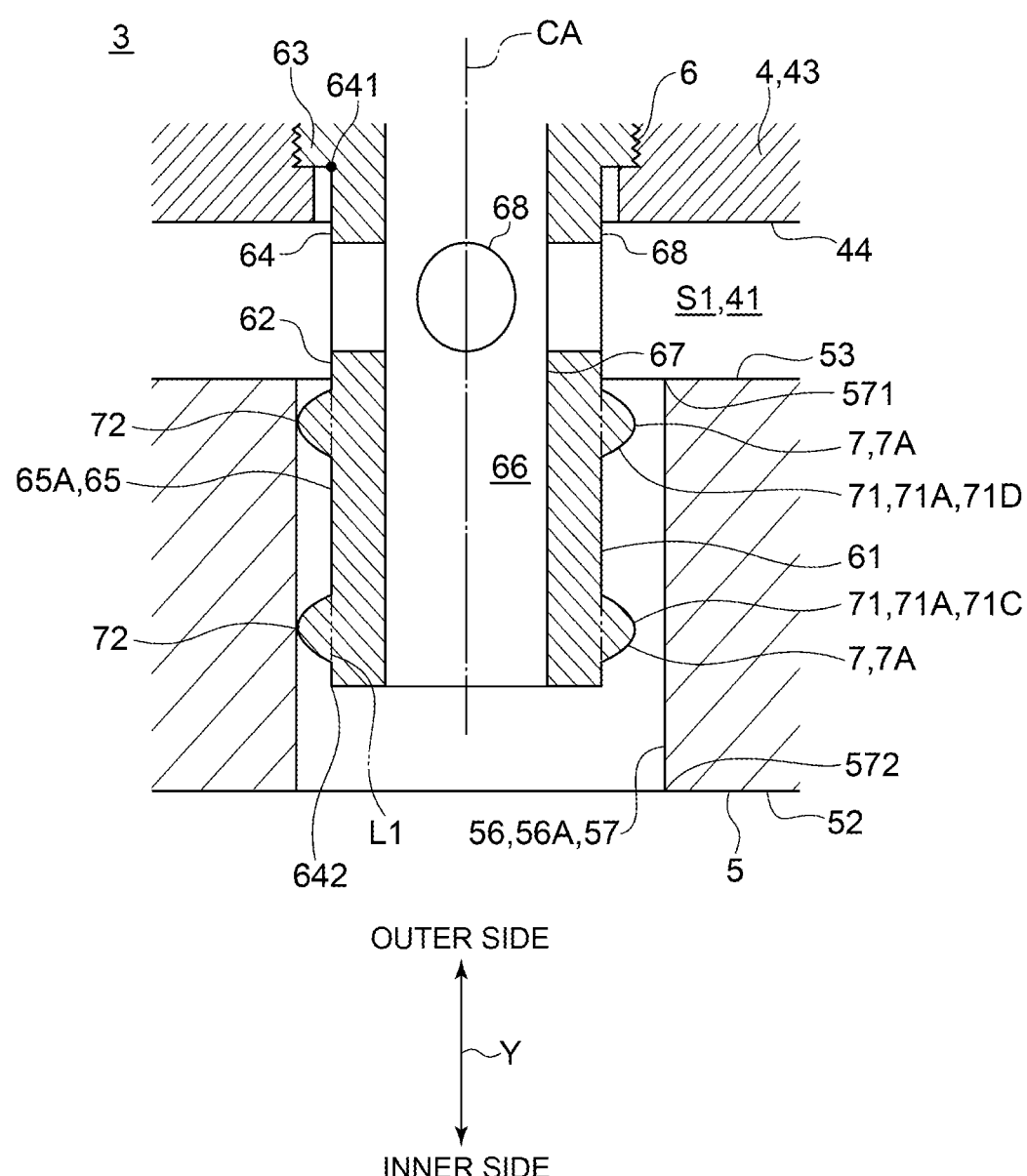
FIG. 7 is a schematic cross-sectional view schematically showing a cross-section perpendicular to the axis of the bearing device according to the second embodiment.
Figure 8:
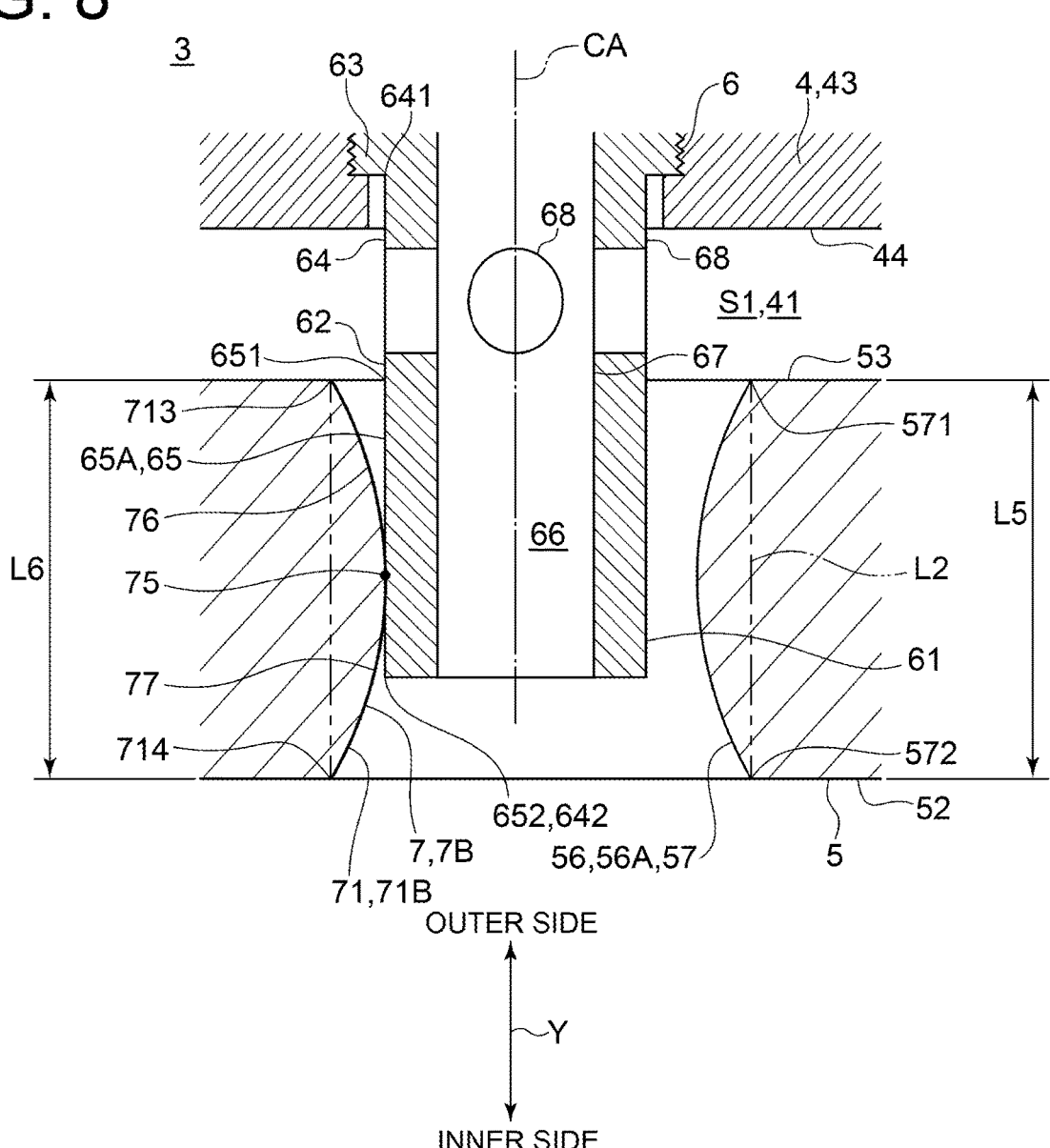
FIG. 8 is a schematic cross-sectional view schematically showing a cross-section perpendicular to the axis of the bearing device according to the third embodiment.
Figure 9:
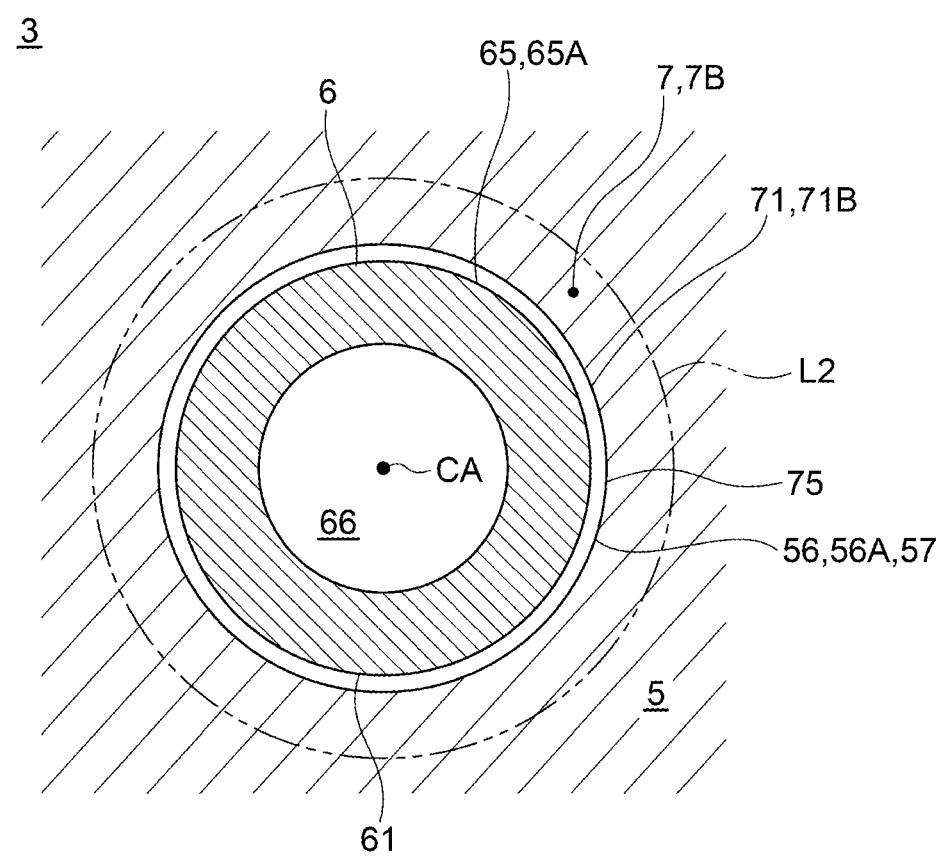
FIG. 9 is a schematic cross-sectional view schematically showing a cross-section perpendicular to the central axis of the anti-rotation pin of the bearing device according to the third embodiment.

FIG. 5 is a schematic cross-sectional view schematically showing a cross-section perpendicular to the axis of the bearing device according to the first embodiment. FIG. 6 is a schematic cross-sectional view schematically showing a cross-section perpendicular to the central axis of the anti-rotation pin of the bearing device according to the first embodiment. FIG. 7 is a schematic cross-sectional view schematically showing a cross-section perpendicular to the axis of the bearing device according to the second embodiment. FIG. 8 is a schematic cross-sectional view schematically showing a cross-section perpendicular to the axis of the bearing device according to the third embodiment. FIG. 9 is a schematic cross-sectional view schematically showing a cross-section perpendicular to the central axis of the anti-rotation pin of the bearing device according to the third embodiment.

(Protrusion)

As shown in FIGS. 5 to 9, the bearing device 3 according to some embodiments includes a semi-floating bearing 5 supported by the bearing housing 4, and an anti-rotation pin 6 fixed to the bearing housing 4. The anti-rotation pin 6 has an insertion portion 61 inserted from the outer peripheral side into an insertion hole 56 formed on an outer surface 53 of the semi-floating bearing 5. At least one of the insertion hole 56 or the insertion portion 61 has at least one protrusion 7 that protrudes toward the other of the insertion hole 56 or the insertion portion 61 in a plan view perpendicular to the axis LA of the rotational shaft 2, as shown in FIGS. 5, 7, and 8. The bearing device 3 is configured such that when the semi-floating bearing 5 is displaced in the radial direction or the circumferential direction of the rotational shaft 2, the protrusion 7 (in the illustrated example, convex surface portion 71) formed on at least one of the insertion hole 56 or the insertion portion 61 contacts the other of the insertion hole 56 or the insertion portion 61.

In the embodiments shown in FIGS. 5 to 9, the protrusion 7 is formed on either one of the insertion hole 56 or the insertion portion 61, but in some embodiments, the protrusions 7 may be formed on both the insertion hole 56 and the insertion portion 61.

With the above configuration, in the bearing device 3, since at least one of the insertion hole 56 or the insertion portion 61 has the protrusion 7, compared to the case where the protrusion 7 is not formed on the insertion hole 56 and the insertion portion 61, the contact area between the insertion hole 56 and the insertion portion 61 can be reduced. By reducing the contact area between the insertion hole 56 and the insertion portion 61, the friction generated between the insertion hole 56 and the insertion portion 61 can be reduced, so that the anti-rotation pin 6 is prevented from hindering the movement of the semi-floating bearing 5 along the radial direction. Thus, it is possible to improve the followability of the semi-floating bearing 5 to vibration of the rotational shaft 2 (vibration in radial direction). By making the semi-floating bearing 5 follow the vibration of the rotational shaft 2, the oil film of lubricant oil filled between the semi-floating bearing 5 and the bearing housing 4 (outer peripheral space S1) effectively dampens the vibration of the rotational shaft 2, effectively suppressing the vibration of the rotational shaft 2 (vibration in the radial direction).

In some embodiments, the at least one protrusion 7 includes a convex surface portion 71 that protrudes in a convexly curved shape in a plan view perpendicular to the axis LA of the rotational shaft 2, as shown in FIGS. 5, 7, and 8. In this case, the bearing device 3 can effectively reduce the contact area between the insertion hole 56 and the insertion portion 61 by the convex surface portion 71, effectively reducing the friction generated between the insertion hole 56 and the insertion portion 61. Further, the convex surface portion 71 has a shape that does not hinder the movement of the semi-floating bearing 5 along the radial direction. This effectively prevents the anti-rotation pin 6 from hindering the movement of the semi-floating bearing 5 along the radial direction.

(Pin-Side Protrusion)

In some embodiments, as shown in FIGS. 5 to 7, the at least one protrusion 7 includes a pin-side protrusion 7A formed on the insertion portion 61 of the anti-rotation pin 6. In other words, the insertion portion 61 has at least one pin-side protrusion 7A that protrudes toward the insertion hole 56.

In a plan view perpendicular to the axis LA of the rotational shaft 2, as shown in FIGS. 5 and 7, the pin-side protrusion 7A protrudes toward the insertion hole 56 with respect to a first virtual line L1 (further away from the central axis CA than the first virtual line L1) that linearly connects the outer edge 641 at the boundary between the small-diameter portion 64 and the large-diameter portion 63 of the anti-rotation pin 6 and the inner edge 642 of the small-diameter portion 64 along the radial direction Y. The bearing device 3 is configured such that when the semi-floating bearing 5 is displaced in the radial direction or the circumferential direction of the rotational shaft 2, the pin-side protrusion 7A (in the illustrated example, pin-side convex surface portion 71A) contacts an inner surface 57 of the insertion hole 56.

With the above configuration, the bearing device 3 can reduce the contact area between the insertion hole 56 and the insertion portion 61 by the pin-side protrusion 7A, thus effectively improving the followability of the semi-floating bearing 5 to vibration of the rotational shaft 2 (vibration in radial direction). Further, it is easier to form a protrusion (pin-side protrusion 7A) on the insertion portion 61 of the anti-rotation pin 6 than to form a protrusion (insertion-hole-side protrusion 7B) on the insertion hole 56 of the semi-floating bearing 5.

In the embodiments shown in FIGS. 5 to 7, the pin-side protrusion 7A includes a pin-side convex surface portion 71A (convex surface portion 71) that protrudes in a convexly curved shape toward the insertion hole 56 with respect to the first virtual line L1 in a plan view perpendicular to the axis LA of the rotational shaft 2, as shown in FIGS. 5 and 7.

The pin-side convex surface portion 71A has a most protruding portion 72 where the distance (shortest length) from the first virtual line L1 is the largest in the pin-side convex surface portion 71A, an outer convex surface 73 where the distance from the first virtual line L1 decreases from the most protruding portion 72 toward the outer side (upper side in the figure) in the radial direction Y, and an inner convex surface 74 where the distance from the first virtual line L1 decreases from the most protruding portion 72 toward the inner side (lower side in the figure) in the radial direction Y. The inner convex surface 74 smoothly connects to the outer convex surface 73 at the most protruding portion 72.

With the above configuration, since the pin-side convex surface portion 71A of the anti-rotation pin 6 contacts the insertion hole 56 of the semi-floating bearing 5, the contact area between the insertion hole 56 and the insertion portion 61 can be effectively reduced, and the friction generated between the insertion hole 56 and the insertion portion 61 can be effectively reduced.

In the embodiments shown in FIGS. 5 to 7, the pin-side protrusion 7A having the pin-side convex surface portion 71A is formed on the insertion portion 61, while no protrusion 7 is formed on the insertion hole 56. The inner surface 57 of the insertion hole 56 extends linearly along the radial direction from the outer opening edge 571 to the inner opening edge 572 of the inner surface 57 in a plan view perpendicular to the axis LA of the rotational shaft 2, as shown in FIGS. 5 and 7. In this case, when the semi-floating bearing 5 moves along the radial direction Y, the bearing device 3 can maintain a small contact area between the inner surface 57 of the insertion hole 56 and the pin-side convex surface portion 71A (pin-side protrusion 7A), thus reducing the friction between the inner surface 57 and the pin-side convex surface portion 71A (pin-side protrusion 7A). Thus, it is possible to effectively improve the followability of the semi-floating bearing 5 to vibration of the rotational shaft 2 (vibration in radial direction).

In some embodiments, as shown in FIG. 5, the pin-side convex surface portion 71A of the anti-rotation pin 6 is formed, in the radial direction Y of the rotational shaft 2, over half or more than half an outer surface 65A of the insertion portion 61 that faces the inner surface 57 of the insertion hole 56. The outer surface 65A is the portion of the outer surface 65 of the small-diameter portion 64 inward of the outer surface 53 of the semi-floating bearing 5 in the radial direction Y.

As shown in FIG. 5, the pin-side convex surface portion 71A satisfies the condition of $0.5L3 \leq L4$, where L3 is the maximum length in the radial direction Y from the outer peripheral end 651 to the inner peripheral end 652 of the outer surface 65A of the insertion portion 61, and L4 is the maximum length in the radial direction Y from the outer peripheral end 711 to the inner peripheral end 712 of the pin-side convex surface portion 71A.

By increasing the formation range of the pin-side convex surface portion 71A in the radial direction Y, that is, by increasing the length L4, the pin-side convex surface portion 71A can be brought into contact with the insertion hole 56 more reliably. The pin-side convex surface portion 71A preferably satisfies the condition of $0.7L3 \leq L4$, more preferably $0.9L3 \leq L4$. In the embodiment shown in FIG. 5, the length L4 is equal to the length L3, but the length L4 of the pin-side convex surface portion 71A may be longer than the length L3.

With the above configuration, since the pin-side convex surface portion 71A of the anti-rotation pin 6 is formed, in the radial direction Y of the rotational shaft 2, over half or more than half the outer surface 65A, compared to the case where the pin-side convex surface portion 71A is formed in a small range on the outer surface 65A, the pin-side convex surface portion 71A can be brought into contact with the insertion hole 56 more reliably.

In some embodiments, as shown in FIG. 7, the anti-rotation pin 6 has a plurality of (in the illustrated example, two) pin-side protrusions 7A formed at separate positions in the radial direction Y of the rotational shaft 2. As shown in FIG. 7, the pin-side protrusion 7A includes a first pin-side convex surface portion 71C (pin-side convex surface portion 71A) that protrudes in a convexly curved shape in a plan view perpendicular to the axis LA of the rotational shaft 2, and a second pin-side convex surface portion 71D (pin-side convex surface portion 71A) that protrudes in a convexly curved shape on the outer peripheral side (on the outer side in the radial direction Y) of the first pin-side convex surface portion 71C in a plan view perpendicular to the axis LA of the rotational shaft 2.

In the embodiment shown in FIG. 7, the first pin-side convex surface portion 71C and the second pin-side convex surface portion 71D have the same size, and the distance (shortest length) of the most protruding portion 72 of the first pin-side convex surface portion 71C from the first virtual line L1 is equal to the distance of the most protruding portion 72 of the second pin-side convex surface portion 71D from the first virtual line L1.

With the above configuration, since at least one of the first pin-side convex surface portion 71C or the second pin-side convex surface portion 71D of the anti-rotation pin 6 contacts the insertion hole 56 of the semi-floating bearing 5, the contact area between the insertion hole 56 and the insertion portion 61 can be effectively reduced, and the friction generated between the insertion hole 56 and the insertion portion 61 can be effectively reduced. Additionally, since the anti-rotation pin 6 has a plurality of pin-side convex surface portions 71A (e.g., 71C and 71D), the pin-side convex surface portion 71A can be brought into contact with the insertion hole 56 more reliably. Additionally, since the anti-rotation pin 6 has a plurality of pin-side convex surface portions 71A (e.g., 71C and 71D), compared to the case where the anti-rotation pin 6 has one pin-side convex surface portion 71A, the size of each pin-side convex surface portion 71A can be reduced.

In some embodiments, the first pin-side convex surface portion 71C may be larger than the second pin-side convex surface portion 71D, and the distance (shortest length) of the most protruding portion 72 of the first pin-side convex surface portion 71C from the first virtual line L1 may be longer than the distance of the most protruding portion 72 of the second pin-side convex surface portion 71D from the first virtual line L1. Alternatively, in some embodiments, the first pin-side convex surface portion 71C may be smaller than the second pin-side convex surface portion 71D, and the distance (shortest length) of the most protruding portion 72 of the first pin-side convex surface portion 71C from the first virtual line L1 may be shorter than the distance of the most protruding portion 72 of the second pin-side convex surface portion 71D from the first virtual line L1.

(Insertion-Hole-Side Protrusion)

In some embodiments, as shown in FIGS. 8 and 9, the at least one protrusion 7 includes an insertion-hole-side protrusion 7B formed on the insertion hole 56 of the semi-floating bearing 5. In other words, the insertion hole 56 has at least one insertion-hole-side protrusion 7B that protrudes toward the insertion portion 61.

The insertion-hole-side protrusion 7B protrudes toward the insertion portion 61 (toward central axis CA) with respect to a second virtual line L2 that linearly connects the outer opening edge 571 and the inner opening edge 572 of the insertion hole 56 along the radial direction Y in a plan view perpendicular to the axis LA of the rotational shaft 2, as shown in FIG. 8. The bearing device 3 is configured such that when the semi-floating bearing 5 is displaced in the radial direction or the circumferential direction of the rotational shaft 2, the insertion-hole-side protrusion 7B (in the illustrated example, insertion-hole-side convex surface portion 71B) contacts the outer surface 65A of the insertion portion 61.

With the above configuration, the bearing device 3 can reduce the contact area between the insertion hole 56 and the insertion portion 61 by the insertion-hole-side protrusion 7B, thus effectively improving the followability of the semi-floating bearing 5 to vibration of the rotational shaft 2 (vibration in radial direction).

In the embodiments shown in FIGS. 8 and 9, the insertion-hole-side protrusion 7B includes an insertion-hole-side convex surface portion 71B (convex surface portion 71) that protrudes in a convexly curved shape toward the insertion portion 61 with respect to the second virtual line L2 in a plan view perpendicular to the axis LA of the rotational shaft 2, as shown in FIG. 8.

The insertion-hole-side convex surface portion 71B has a most protruding portion 75 where the distance (shortest length) from the second virtual line L2 is the largest in the insertion-hole-side convex surface portion 71B, an outer convex surface 76 where the distance from the second virtual line L2 decreases from the most protruding portion 75 toward the outer side (upper side in the figure) in the radial direction Y, and an inner convex surface 77 where the distance from the second virtual line L2 decreases from the most protruding portion 75 toward the inner side (lower side in the figure) in the radial direction Y. The inner convex surface 77 smoothly connects to the outer convex surface 76 at the most protruding portion 75.

With the above configuration, since the insertion-hole-side convex surface portion 71B of the insertion hole 56 contacts the insertion portion 61 of the anti-rotation pin 6, the contact area between the insertion hole 56 and the insertion portion 61 can be effectively reduced, and the friction generated between the insertion hole 56 and the insertion portion 61 can be effectively reduced.

In the embodiments shown in FIGS. 8 and 9, the insertion-hole-side protrusion 7B having the insertion-hole-side convex surface portion 71B is formed on the insertion hole 56, while no protrusion 7 is formed on the insertion portion 61. The outer surface 65A of the insertion portion 61 extends linearly along the radial direction from the outer peripheral end 651 to the inner peripheral end 652 of the outer surface 65A in the radial direction Y in a plan view perpendicular to the axis LA of the rotational shaft 2, as shown in FIG. 8. The outer surface 65 of the small-diameter portion 64 of the anti-rotation pin 6 may extend linearly along the radial direction from the outer edge 641 to the inner edge 642 of the outer surface 65 in the radial direction Y in a plan view perpendicular to the axis LA of the rotational shaft 2, as shown in FIG. 8. In this case, when the semi-floating bearing 5 moves along the radial direction Y, the bearing device 3 can maintain a small contact area between the outer surface 65A of the insertion portion 61 and the insertion-hole-side convex surface portion 71B (insertion-hole-side protrusion 7B), thus reducing the friction between the outer surface 65A and the insertion-hole-side convex surface portion 71B (insertion-hole-side protrusion 7B). Thus, it is possible to effectively improve the followability of the semi-floating bearing 5 to vibration of the rotational shaft 2 (vibration in radial direction).

In some embodiments, as shown in FIG. 8, the insertion-hole-side convex surface portion 71B of the semi-floating bearing 5 is formed, in the radial direction Y of the rotational shaft 2, over half or more than half the inner surface 57 of the insertion hole 56 that faces the outer surface 65A of the insertion portion 61.

As shown in FIG. 8, the insertion-hole-side convex surface portion 71B satisfies the condition of $0.5L5 \leq L6 \leq L5$, where L5 is the maximum length in the radial direction Y from the outer peripheral end (outer opening edge 571) to the inner peripheral end (inner opening edge 572) of the inner surface 57 of the insertion hole 56, and L6 is the maximum length in the radial direction Y from the outer peripheral end 713 to the inner peripheral end 714 of the insertion-hole-side convex surface portion 71B.

By increasing the formation range of the insertion-hole-side convex surface portion 71B in the radial direction Y, that is, by increasing the length L6, the insertion-hole-side convex surface portion 71B can be brought into contact with the insertion portion 61 more reliably. The insertion-hole-side convex surface portion 71B preferably satisfies the condition of $0.7L5 \leq L6 \leq L5$, more preferably $0.9L5 \leq L6 \leq L5$. In the embodiment shown in FIG. 8, the length L6 is equal to the length L5.

With the above configuration, since the insertion-hole-side convex surface portion 71B of the semi-floating bearing 5 is formed, in the radial direction Y of the rotational shaft 2, over half or more than half the inner surface 57, compared to the case where the insertion-hole-side convex surface portion 71B is formed in a small range on the inner surface 57, the insertion-hole-side convex surface portion 71B can be brought into contact with the insertion portion 61 more reliably.

In some embodiments, the insertion hole 56 of the semi-floating bearing 5 may have a plurality of insertion-hole-side convex surface portions 71B formed at separated positions in the radial direction Y of the rotational shaft 2.

In some embodiments, the at least one protrusion 7 (pin-side protrusion 7A, insertion-hole-side protrusion 7B) of the bearing device 3 is formed annularly in a plan view perpendicular to the central axis CA of the anti-rotation pin 6, as shown in FIGS. 6 and 9. In this case, not only when the semi-floating bearing 5 is displaced in the radial direction or the circumferential direction of the rotational shaft 2, but also when the semi-floating bearing 5 is displaced in the axial direction of the rotational shaft 2, the protrusion 7 formed on one of the insertion hole 56 or the insertion portion 61 can be brought into contact with the other. This reduces the contact area between the insertion hole 56 and the insertion portion 61, reducing the friction generated between the insertion hole 56 and the insertion portion 61. Thus, the annularly formed protrusion 7 can respond to the multi-directional displacement of the semi-floating bearing 5 more effectively than the protrusion 7 that is not annularly formed, effectively improving the followability of the semi-floating bearing 5 to vibration of the rotational shaft 2.

In some embodiments, as shown in FIGS. 3 and 5 to 9, the insertion hole 56 of the bearing device 3 includes a through hole 56A that penetrates from the outer surface 53 to the inner surface 52 of the semi-floating bearing 5, and the lubricant oil passage 66 for supplying lubricant oil between the inner surface 52 of the semi-floating bearing 5 and the outer surface 21 of the rotational shaft 2, i.e., to the inner peripheral space S2, is formed inside the anti-rotation pin 6.

With the above configuration, since the lubricant oil passage 66 is formed inside the anti-rotation pin 6 inserted into the through hole 56A, lubricant oil can be supplied between the inner surface 52 of the semi-floating bearing 5 and the outer surface 21 of the rotational shaft 2 (inner peripheral space S2) through the lubricant oil passage 66.

This eliminates the need to provide an additional lubricant oil passage in the semi-floating bearing 5 for supplying lubricant oil between the inner surface 52 of the semi-floating bearing 5 and the outer surface 21 of the rotational shaft 2 separately from the through hole 56A, reducing the complexity of structure and the increase in size of the bearing device 3.

In some embodiments, as shown in FIGS. 5 to 9, the anti-rotation pin 6 has at least one oil supply hole 68 for supplying lubricant oil between the outer surface 53 of the semi-floating bearing 5 and the support surface 44 of the bearing housing 4, i.e., to the outer peripheral space S1. In this case, lubricant oil can be supplied to the outer peripheral space S1 through the oil supply hole 68. This reduces the complexity of structure of the lubricant oil passage for supplying lubricant oil to the outer peripheral space S1, thus reducing the complexity of structure and the increase in size of the bearing device 3.

In some embodiments, as shown in FIG. 2, the bearing device 3 includes the above-described semi-floating bearing 5, the above-described anti-rotation pin 6, and a pair of thrust collars 31, 32 mounted on the rotational shaft 2. Each of the pair of thrust collars 31, 32 is arranged with a gap (axial gap S3, S4) between the thrust collar and one end portion 54 or the other end portion 55 of the semi-floating bearing 5 in the axial direction (right-left direction in the figure).

The thrust collar 31 has a facing surface 311 that faces the axial end surface 54A formed at the one end portion 54 of the semi-floating bearing 5 with the axial gap S3 therebetween. The thrust collar 32 has a facing surface 321 that faces the axial end surface 55A formed at the other end portion 55 of the semi-floating bearing 5 with the axial gap S4 therebetween. The facing surfaces 311, 321 extend along the direction (radial direction Y) perpendicular to the axial direction X on the outer peripheral side of the rotational shaft 2.

The axial end surface (compressor-side end surface) 54A is formed annularly with the axial end of the inner surface 52 on one side (compressor side XC) in the axial direction X as the inner peripheral edge and the axial end of the outer surface 53 on the one side (compressor side XC) in the axial direction X as the outer peripheral edge. The axial end surface 55A is formed annularly with the axial end of the inner surface 52 on the other side (turbine side XT) in the axial direction X as the inner peripheral edge and the axial end of the outer surface 53 on the other side (turbine side XT) in the axial direction X as the outer peripheral edge. The axial end surfaces 54A, 55A extend along the direction (radial direction Y) perpendicular to the axial direction X.

With the above configuration, since the semi-floating bearing 5 is arranged with gaps (axial gaps S3 and S4) between it and the pair of thrust collars 31, 32, the semi-floating bearing 5 can support not only the radial load (load perpendicular to the axial direction X of the rotational shaft 2) but also the thrust load (load parallel to the axial direction X of the rotational shaft 2). That is, the semi-floating bearing 5 of the bearing device 3 functions as both a journal bearing and a thrust bearing. In this case, it is possible to reduce the complexity of structure and the increase in size of the bearing device 3.

In some embodiment, as shown in FIG. 1, the rotating machine 1 (turbocharger 1A) according to some embodiments includes the above-described rotational shaft 2 and the above-described bearing device 3. In this case, the rotating machine 1 with the bearing device 3 can improve the followability of the semi-floating bearing 5 to vibration of the rotational shaft 2 (vibration in radial direction) by the protrusion 7 formed on the insertion hole 56 of the semi-floating bearing 5 or the insertion portion 61 of the anti-rotation pin 6. As a result, it is possible to effectively suppress vibration of the rotational shaft 2 (vibration in the radial direction) and thus suppress the efficiency degradation and wear of the rotating machine 1 due to vibration of the rotational shaft 2.

The present disclosure is not limited to the embodiments described above, but includes modifications to the embodiments described above, and embodiments composed of combinations of those embodiments.

The contents described in the above embodiments would be understood as follows, for instance.

1) A bearing device (3) according to at least one embodiment of the present disclosure is a bearing device (3) configured to rotatably support a rotational shaft (2) of a rotating machine (1), including: a semi-floating bearing (5) supported by a bearing housing (4); and an anti-rotation pin (6) fixed to the bearing housing (4) and having an insertion portion (61) inserted from an outer peripheral side into an insertion hole (56) formed on an outer surface (53) of the semi-floating bearing (5). At least one of the insertion hole (56) or the insertion portion (61) has at least one protrusion (7) that protrudes toward the other of the insertion hole (56) or the insertion portion (61) in a plan view perpendicular to an axis (LA) of the rotational shaft (2).

With the above configuration 1), in the bearing device (3), since at least one of the insertion hole (56) or the insertion portion (61) has the protrusion (7), compared to the case where the protrusion (7) is not formed on the insertion hole (56) and the insertion portion (61), the contact area between the insertion hole (56) and the insertion portion (61) can be reduced. By reducing the contact area between the insertion hole (56) and the insertion portion (61), the friction generated between the insertion hole (56) and the insertion portion (61) can be reduced, so that the anti-rotation pin (6) is prevented from hindering the movement of the semi-floating bearing (5) along the radial direction. Thus, it is possible to improve the followability of the semi-floating bearing (5) to vibration of the rotational shaft (2) (vibration in radial direction). By making the semi-floating bearing (5) follow the vibration of the rotational shaft (2), the oil film of lubricant oil filled between the semi-floating bearing (5) and the bearing housing (4) (outer peripheral space S1) effectively dampens the vibration of the rotational shaft (2), effectively suppressing the vibration of the rotational shaft (2) (vibration in the radial direction).

2) In some embodiments, in the bearing device (3) described in 1), the at least one protrusion (7) includes a pin-side protrusion (7A) formed on the insertion portion (61).

With the above configuration 2), the pin-side protrusion (7A) can reduce the contact area between the insertion hole (56) and the insertion portion (61), thus effectively improving the followability of the semi-floating bearing (5) to vibration of the rotational shaft (2) (vibration in radial direction). Further, it is easier to form a protrusion (pin-side protrusion 7A) on the insertion portion (61) of the anti-rotation pin (6) than to form a protrusion (insertion-hole-side protrusion 7B) on the insertion hole (56) of the semi-floating bearing (5).

3) In some embodiments, in the bearing device (3) described in 1), the at least one protrusion (7) includes an insertion-hole-side protrusion (7B) formed on the insertion hole (56).

With the above configuration 3), the insertion-hole-side protrusion (7B) can reduce the contact area between the insertion hole (56) and the insertion portion (61), thus effectively improving the followability of the semi-floating bearing (5) to vibration of the rotational shaft (2) (vibration in radial direction).

4) In some embodiments, in the bearing device (3) described in any one of 1) to 3), the at least one protrusion (7) includes a convex surface portion (71) that protrudes in a convexly curved shape in a plan view perpendicular to the axis (LA) of the rotational shaft (2).

With the above configuration 4), the convex surface portion (71) can effectively reduce the contact area between the insertion hole (56) and the insertion portion (61), effectively reducing the friction generated between the insertion hole (56) and the insertion portion (61). Further, the convex surface portion (71) has a shape that does not hinder the movement of the semi-floating bearing (5) along the radial direction. This effectively prevents the anti-rotation pin (6) from hindering the movement of the semi-floating bearing (5) along the radial direction.

5) In some embodiments, in the bearing device (3) described in 2), the pin-side protrusion (7A) includes a pin-side convex surface portion (71A) that protrudes in a convexly curved shape in a plan view perpendicular to the axis (LA) of the rotational shaft (2). The pin-side convex surface portion (71A) is formed, in a radial direction of the rotational shaft (2), over half or more than half a surface (outer surface 65A) of the insertion portion (61) that faces the insertion hole (56).

With the above configuration 5), since the pin-side convex surface portion (71A) of the anti-rotation pin (6) contacts the insertion hole (56) of the semi-floating bearing (5), the contact area between the insertion hole (56) and the insertion portion (61) can be effectively reduced, and the friction generated between the insertion hole (56) and the insertion portion (61) can be effectively reduced. Additionally, since the pin-side convex surface portion (71A) of the anti-rotation pin (6) is formed, in the radial direction of the rotational shaft (2), over half or more than half the surface (outer surface 65A), compared to the case where the pin-side convex surface portion (71A) is formed in a small range on the surface in the radial direction, the pin-side convex surface portion (71A) can be brought into contact with the insertion hole (56) more reliably.

6) In some embodiments, in the bearing device (3) described in 2), the pin-side protrusion (7A) includes: a first pin-side convex surface portion (71C) that protrudes in a convexly curved shape in a plan view perpendicular to the axis (LA) of the rotational shaft (2); and a second pin-side convex surface portion (71D) that protrudes in a convexly curved shape on an outer peripheral side of the first pin-side convex surface portion (71C) in a plan view perpendicular to the axis (LA) of the rotational shaft (2).

With the above configuration 6), since at least one of the first pin-side convex surface portion (71C) or the second pin-side convex surface portion (71D) of the anti-rotation pin (6) contacts the insertion hole (56) of the semi-floating bearing (5), the contact area between the insertion hole (56) and the insertion portion (61) can be effectively reduced, and the friction generated between the insertion hole (56) and the insertion portion (61) can be effectively reduced. Additionally, since the anti-rotation pin (6) has a plurality of pin-side convex surface portions (71A; e.g., 71C and 71D), the pin-side convex surface portion (71A) can be brought into contact with the insertion hole (56) more reliably.

7) In some embodiments, in the bearing device (3) described in 3), the insertion-hole-side protrusion (7B) includes an insertion-hole-side convex surface portion (71B) that protrudes in a convexly curved shape in a plan view perpendicular to the axis (LA) of the rotational shaft (2). The insertion-hole-side convex surface portion (71B) is formed, in a radial direction of the rotational shaft (2), over half or more than half a surface (inner surface 57) of the insertion hole (56) that faces the insertion portion (61).

With the above configuration 7), since the insertion-hole-side convex surface portion (71B) of the insertion hole (56) contacts the insertion portion (61) of the anti-rotation pin (6), the contact area between the insertion hole (56) and the insertion portion (61) can be effectively reduced, and the friction generated between the insertion hole (56) and the insertion portion (61) can be effectively reduced. Additionally, since the insertion-hole-side convex surface portion (71B) of the insertion hole (56) is formed, in the radial direction of the rotational shaft (2), over half or more than half the surface (inner surface 57), compared to the case where the insertion-hole-side convex surface portion (71B) is formed in a small range on the surface in the radial direction, the insertion-hole-side convex surface portion (71B) can be brought into contact with the insertion portion (61) more reliably.

8) In some embodiments, in the bearing device (3) described in any one of 1) to 7), the at least one protrusion (7) is formed annularly in a plan view perpendicular to a central axis (CA) of the anti-rotation pin (6).

With the above configuration 8), the protrusion (7) is formed annularly in a plan view perpendicular to the central axis (CA) of the anti-rotation pin (6). In this case, not only when the semi-floating bearing (5) is displaced in the radial direction or the circumferential direction of the rotational shaft (2), but also when the semi-floating bearing (5) is displaced in the axial direction of the rotational shaft (2), the protrusion (7) formed on one of the insertion hole (56) or the insertion portion (61) can be brought into contact with the other. This reduces the contact area between the insertion hole (56) and the insertion portion (61), reducing the friction generated between the insertion hole (56) and the insertion portion (61). Thus, the annularly formed protrusion (7) can respond to the multi-directional displacement of the semi-floating bearing (5) more effectively than the protrusion 7 that is not annularly formed, effectively improving the followability of the semi-floating bearing (5) to vibration of the rotational shaft (2) (vibration in the radial direction).

9) In some embodiments, in the bearing device (3) described in any one of 1) to 8), the insertion hole (56) includes a through hole (56A) that penetrates from the outer surface (53) to an inner surface (52) of the semi-floating bearing (5). A lubricant oil passage (66) for supplying lubricant oil between the inner surface (52) of the semi-floating bearing (5) and an outer surface (21) of the rotational shaft (2) (inner peripheral space S2) is formed inside the anti-rotation pin (6).

With the above configuration 9), since the lubricant oil passage (66) is formed inside the anti-rotation pin (6) inserted into the through hole (56A), lubricant oil can be supplied between the inner surface (52) of the semi-floating bearing (5) and the outer surface (21) of the rotational shaft (2) (inner peripheral space S2) through the lubricant oil passage (66). This eliminates the need to provide an additional lubricant oil passage in the semi-floating bearing (5) for supplying lubricant oil between the inner surface (52) of the semi-floating bearing (5) and the outer surface (21) of the rotational shaft (2) separately from the through hole (56A), reducing the complexity of structure and the increase in size of the bearing device (3).

10) In some embodiments, the bearing device (3) described in any one of 1) to 9) further includes a pair of thrust collars (31, 32) mounted on the rotational shaft (2), each of the pair of thrust collars (31, 32) being arranged with a gap (axial gap S3, S4) between the thrust collar and one end portion (54) or another end portion (55) of the semi-floating bearing (5) in an axial direction.

With the above configuration 10), since the semi-floating bearing (5) is arranged with gaps (axial gaps S3 and S4) between it and the pair of thrust collars (31, 32) in the axial direction of the semi-floating bearing (5), the semi-floating bearing (5) can support not only the radial load (load perpendicular to the axial direction of the rotational shaft) but also the thrust load (load parallel to the axial direction of the rotational shaft). That is, the semi-floating bearing (5) of the bearing device (3) functions as both a journal bearing and a thrust bearing. In this case, it is possible to reduce the complexity of structure and the increase in size of the bearing device (3).

11) A rotating machine according to at least one embodiment of the present disclosure includes the bearing device (3) described in any one of 1) to 10) and the rotational shaft (2).

With the above configuration 12), the rotating machine (1) with the bearing device (3) can improve the followability of the semi-floating bearing (5) to vibration of the rotational shaft (2) (vibration in radial direction) by the protrusion (7) formed on the insertion hole (56) of the semi-floating bearing (5) or the insertion portion (61) of the anti-rotation pin (6). As a result, it is possible to effectively suppress vibration of the rotational shaft (2) and thus suppress the efficiency degradation and wear of the rotating machine (1) due to vibration of the rotational shaft (2).

REFERENCE SIGNS LIST

1 Rotating machine
1A Turbocharger
2 Rotational shaft
3, 03 Bearing device
4 Bearing housing
5, 05 Semi-floating bearing
6, 06 Anti-rotation pin
7 Protrusion
7A Pin-side protrusion
7B Insertion-hole-side protrusion
11 Impeller
12 Turbine rotor
13 Compressor housing
14 Turbine housing
31 Thrust collar
32 Thrust collar
41 Interior space
42 Lubricant oil introduction passage
43 Bearing support portion
44 Support surface
45 Radial hole
46 Female thread
47 Plug
48 Space 49 Oil discharge space
51 Shaft insertion hole
52 Inner surface
53 Outer surface
54 One end portion
54A Axial end surface
55 Other end portion
55A Axial end surface
56, 056 Insertion hole
56A Through hole
57, 057 Inner surface
61, 061 Insertion portion
62 Non-insertion portion
63 Large-diameter portion
64 Small-diameter portion
65, 065 Outer surface
66 Lubricant oil passage
67 Through hole
68 Oil supply hole
71 Convex surface portion
71A, 71C, 71D Pin-side convex surface portion
71B Insertion-hole-side convex surface portion
72, 75 Most protruding portion
73, 76 Outer convex surface
74, 77 Inner convex surface
CA Central axis (of anti-rotation pin)
L1 First virtual line
L2 Second virtual line
LA Axis (of rotational shaft)
S1 Outer peripheral space
S2 Inner peripheral space
S3, S4 Axial gap
X Axial direction (of rotational shaft)
XC Compressor side (in axial direction)
XT Turbine side (in axial direction)
Y Radial direction (of rotational shaft)

The invention claimed is:

1. A bearing device configured to rotatably support a rotational shaft of a rotating machine, comprising:
   a semi-floating bearing supported by a bearing housing; and
   an anti-rotation pin fixed to the bearing housing and having an insertion portion inserted from an outer peripheral side into an insertion hole formed on an outer surface of the semi-floating bearing,
   wherein, in a plan view perpendicular to an axis of the rotational shaft, the insertion portion has an outer surface that extends linearly along a direction perpendicular to an axis of the bearing device, and at least one pin-side protrusion that protrudes toward the other of the insertion hole, wherein the pin-side protrusion includes: a first pin-side convex surface portion that protrudes in a convexly curved shape in a plan view perpendicular to the axis of the rotational shaft; and a second pin-side convex surface portion that protrudes in a convexly curved shape on an outer peripheral side of the first pin-side convex surface portion in a plan view perpendicular to the axis of the rotational shaft, the second pin-side convexly curved portion being separated from the first pin-side convexly curved portion by the outer surface of the insertion portion.

2. The bearing device according to claim 1, wherein the at least one protrusion is formed annularly in a plan view perpendicular to a central axis of the anti-rotation pin.

3. The bearing device according to claim 1, wherein the insertion hole includes a through hole that penetrates from the outer surface to an inner surface of the semi-floating bearing, and wherein a lubricant oil passage for supplying lubricant oil between the inner surface of the semi-floating bearing and an outer surface of the rotational shaft is formed inside the anti-rotation pin.

4. The bearing device according to claim 1, further comprising a pair of thrust collars mounted on the rotational shaft, each of the pair of thrust collars being arranged with a gap between the thrust collar and one end portion or another end portion of the semi-float bearing in an axial direction.

5. A rotating machine, comprising:

the bearing device according to claim 1; and the rotational shaft.

6. The bearing device according to claim 1, wherein an inner edge of the insertion portion is config- ured to be located on an outer peripheral side of an inner surface of the semi-floating bearing.

7. The bearing device according to claim 1, wherein a radial distance between the first pin-side con- vexly curved portion and the second pin-side convexly curved portion is larger than a radial distance between the first pin-side convexly curved portion and an inner radial edge of the insertion portion.

*  *  *  *  *